Oct. 5, 1965          P. KRAFT          3,209,876

FRICTION PRODUCING DEVICE

Filed Feb. 25, 1963

INVENTOR
PAUL KRAFT

United States Patent Office 3,209,876
Patented Oct. 5, 1965

3,209,876
FRICTION PRODUCING DEVICE
Paul Kraft, Reinbek, near Hamburg, Germany, assignor to Jurid-Werke G.m.b.H., Hamburg, Germany
Filed Feb. 25, 1963, Ser. No. 260,782
Claims priority, application Germany, Apr. 6, 1962, J 21,567
1 Claim. (Cl. 192—107)

The present invention relates to mounting structures for segments of friction material lining which are used in clutch devices, brakes and the like.

Plates for clutches and brakes are very often manufactured from sheet steel and are provided with a lining of friction material on either side. It is usual to rivet either the linings themselves or the carrier plate for the linings to the clutch plate, the gauge of the clutch plate generally being greater than the combined depth of the thin hubs provided on either carrier plate, so that the backs of the carrier plates lie against the clutch plate. The rivet therefore serves as both a connecting member and supporting member for the friction segments and the plates. It has been found that, if the friction segments are made of organic friction materials, which have usually a poor thermal conductivity, the frictional heat generated in the clutch or brake flows chiefly into the opposing friction surface. If sintered inorganic material is used for the friction linings, which has a very good thermal conductivity, the plate reaches almost the temperature of the friction surface. Depending upon wear of the clutch or brake, the heating of the plate can cause fading, particularly if a duplex material is associated with the sintered material, which encourages distortion because of the different coefficients of expansion of the constituent materials. Clutches and brakes with plates which become distorted under thermal stress cannot work accurately and lead to faults in their operation.

Further, it has occurred in practice that with this type of construction the mounting is not always efficient after long use and moreover, the shear forces cannot be absorbed in many cases, so that the carrier plates partially shear off after comparatively short periods of use.

It is an object of the present invention to provide a mounting arrangement for the segments of friction material which are used in brakes, clutches or similar devices, in which frictional heat generated by the brakes is prevented from flowing into the plate.

Another object of this invention is to prevent heat distortion of the plate, by which an accurate action is impaired. It is a further object of the invention to provide a rigid mounting arrangement which is efficient even after long use and is capable of absorbing shear forces and of preventing shearing of the carrier plate.

Another object of the invention is to provide a pair of friction segments which are so assembled with plates for use in clutches and brakes that an air gap is left between the friction segments and the plates. According to a further embodiment, the air gap is made so that friction segments are used which have hubs comprising lower support surfaces, the hubs being so dimensioned that the sum of the depths of both hubs on the pair of friction segments is greater than the gauge of the clutch plate located between the pair of friction segments.

Yet another object of the invention is a friction material lining segment comprising a substantially flat peripheral portion, a center hole and a hub circumferentially joining to said center hole, said hub having a substantial support surface and the depth of the hub being greater than half the thickness of the plate provided to be engaged with two of said friction material lining segments. Said segment may have a recess adapted to have the head of a center rivet resting in, and further be provided with at least one projection at the peripheral portion, adapted to fit into corresponding openings in the plate used to be assembled with a pair of said friction material lining segments.

The improved arrangement of friction segments according to the invention has the result that, on assembly of the pairs of friction segments with the plate, in which only single, ordinary rivets are necessary, the carrier plates are no longer fixed firmly by their lower sides to the plate, but now the lower surfaces of the hubs rest against one another, and consequently the rivet only serves as a connecting and supporting member for the pair of carrier plates or the pair of friction segments, which thus form a unit. The hubs of the friction segments are recessed into holes in the plate, which permit axial displacement of the friction segments. Within the pair of friction segments, the clutch plate also has a certain movement. A more or less appreciable air space is left between the plate and the peripheral underside of the segments. Distortion and deformation of material under the influence of the frictional heat produced now have no effect.

If the clutch or brake is operated the friction segments abut their opposing friction surfaces, without the possibly not-planar plate exerting an additional localised pressure. Unequal heating is thus ruled out and equal wear is guaranteed. By this means a satisfactory action for the clutch or brake is possible. In this way, the transfer of heat from the friction material to the plate is greatly reduced. Further, with a non-planar plate, harmful effects during brake or clutch operation due to localised heating are excluded. Reduction of the heat transfer from the friction segments to the plate is achieved because of the air gap provided according to the invention. Also, the broadened hubs are capable of absorbing forces set up transversely of the axis. Shearing of the carrier plates is reliably avoided. The rivets are no longer subjected to shear forces, so that normal rivets may be used.

The invention and the advantages which result from it are more closely illustrated by referring to the method of construction represented in the accompanying drawings, wherein:

FIGURE 1b is a section view of the segment of FIGURE 1a;

Figure 1A:
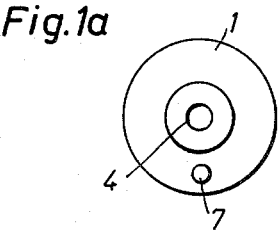
FIGURE 1a is an elevation view of a single friction segment embodiment of the invention.
Figure 1B:
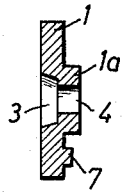
Figure 2:
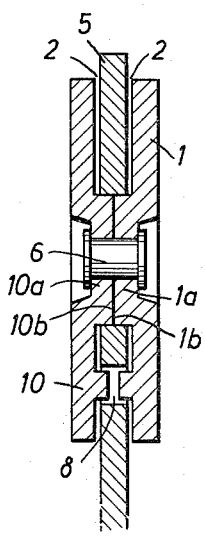
FIGURE 2 is a section view taken on a mounting of a pair of friction segments with a clutch plate.

The friction disc for brakes, as is represented in FIGURE 2, consists of the friction segment 1 (FIGURE 1) which has a hub 1a and which rests in its assembled state with its surface 1b against the corresponding surface 10b of the hub 10a of the opposing segment 10. The combined depth of the hubs 1a and 10a is greater than the thickness of the plate 5 located between the pair of friction segments 1 and 10, so that a narrow air gap 2 is left between the friction segment 1 and plate 5 on the one side and between the friction segment 10 and the plate 5 on the other side. These air gaps serve as insulation between the material of the friction segments and the metal of the plate which is usually made of sheet steel, and prevent a transfer of frictional heat from the brakes to the steel plate.

Friction segments 1 and 10 and plate 5 are fastened to one another by means of a rivet 6 having its head resting in a recess 3 and having a hole 4 cut for its body. Projections 7 which fit into corresponding openings 8 in the plate 5 are arranged on the friction segment to prevent distortion of the parts.

Each friction segment can be made for example of usual friction material, which is fixed in a container, in a cup-shaped device, or even on a flat carrier plate. The friction material can just as easily be made of organic friction lining materials, i.e. non-metallic materials usually asbestos and other ingredients in a resin or rubber base binder, as of inorganic friction materials e.g. sintered metal friction material which is made by pressing and sintering a predominantly metallic mixture of metallic and non-metallic powders. This invention is not limited to any particular type of friction material.

Neither is the present invention limited with regard to the shape of the friction segments, even though the friction segments usually have a round external shape, as shown in FIGURE 1. They can, however, be made in other shades, for example, in trapezoidal form or in the form of a segment of a circle.

Also I have illustrated a specific embodiment of the invention, it is apparent that the invention is not limited to the specific forms of construction illustrated, but may be embodied as well in other forms of construction within the scope of the appended claim.

I claim:

A friction producing device comprising a relatively thin support plate having an aperture therein, a pair of relatively flat friction segments disposed on opposite sides of said plate and generally aligned with the aperture therein, each of said friction segments having an inner surface facing said support plate and directly mechanically engageable therewith, selectively, each of said friction segments having an outer surface frictionally engageable with a complementary surface and means extending through the aperture in said plate for securing said friction segments to one another and for positively maintaining the inner surfaces of said friction segments in a spaced relaion relative to each other greater than the thickness of said plate whereby an uninterrupted air space is maintained at all times between the inner surface of at least one of said segments and said support plate to minimize conductive heat transfer therebetween.

References Cited by the Examiner

UNITED STATES PATENTS

| | | | |
|---|---|---|---|
| 632,944 | 9/99 | Jansen | 77—29 |
| 2,916,123 | 12/59 | Garmager | 192—107 |
| 2,949,991 | 8/60 | Jaeschke. | |
| 2,986,252 | 5/61 | Du Bois | 192—107 |
| 3,064,782 | 11/62 | Du Bois | 192—107 |

FOREIGN PATENTS 499,589   1/39   Great Britain.

DAVID J. WILLIAMOWSKY, *Primary Examiner.*